United States Patent [19]

Zillgen et al.

[11] Patent Number: 5,054,950
[45] Date of Patent: Oct. 8, 1991

[54] FASTENER FOR CONSTRUCTION SYSTEMS COMPRISING TUBES AND NODES

[76] Inventors: Joachim Zillgen, Karl-Theodor-Str. 3, 5000 Cologne; Uwe W. Renken, Aachener Str. 40, 5047 Wesseling, both of Fed. Rep. of Germany

[21] Appl. No.: 614,317

[22] Filed: Nov. 15, 1990

[30] Foreign Application Priority Data

Nov. 18, 1989 [DE] Fed. Rep. of Germany ... 8913643[U]

[51] Int. Cl.$^5$ ............................................. F16B 7/00
[52] U.S. Cl. .................................... 403/171; 403/176; 403/167
[58] Field of Search .................... 403/171, 176, 167

[56] References Cited

U.S. PATENT DOCUMENTS

| | | | |
|---|---|---|---|
| 3,995,962 | 12/1976 | Mylaeus | 403/171 X |
| 4,848,952 | 7/1989 | Strassle | 403/171 |
| 4,872,779 | 10/1989 | Imai | 403/176 X |
| 4,915,533 | 4/1990 | de la Haye | 403/176 X |

FOREIGN PATENT DOCUMENTS 676701  8/1979  U.S.S.R. .............................. 403/171

*Primary Examiner*—Andrew V. Kundrat
*Attorney, Agent, or Firm*—Sprung Horn Kramer & Woods

[57] ABSTRACT

A fastener for construction systems, especially for exhibition booths, comprising tubes and nodes, with one screw attaching to a tube and another attaching to a node. The tube-attached screws are accommodated axially aligned in a sleeve that surrounds at least their heads, leaving their threaded shafts extending out. The node-attached screw slides back and forth but cannot rotate in the sleeve and is secured to the tube-attached screw by a threaded bolt that extends through a bore in the latter. The head of the tube-attached screw rotates in the sleeve and has a threaded axial bore that the head with a matching outside thread of an opposing node-attached screw screws into, whereby the thread has the same handedness as the threaded section on the node-attached screw and the bore is long enough to allow the head of the node-attached screw to screw all the way into the head of the tube-attached screw.

6 Claims, 2 Drawing Sheets

FASTENER FOR CONSTRUCTION SYSTEMS COMPRISING TUBES AND NODES

BACKGROUND OF INVENTION

The invention concerns a fastener for construction systems, especially for exhibition booths, comprising tubes and nodes, with one screw attaching to a tube and another attaching to a node, whereby the screws are accommodated axially aligned in a sleeve that surrounds at least their heads, leaving their threaded shafts extending out and whereby the node-attached screw slides back and forth but cannot rotate in the sleeve and is secured to the tube-attached screw by a threaded bolt that extends through a bore in the latter.

Systems for constructing exhibition booths for trade shows, etc. are available in the form of kits comprising tubes and nodes. The nodes can be essentially spherical for example and have inside-threaded bores oriented in different directions. Strut in the for of tubes can be secured to the nodes by fasteners to produce a coherent structure.

One known fastener features a node-attached screw that move axially in relation to a hexagonal sleeve but cannot be countersunk. The fastener is attached to the tube and the hexagonal sleeve is manipulated with a wrench. The outside diameter of the fastener is identical for every pipe diameter encountered in booth construction.

Another known fastener has an axially movable node-attached screw that, although it can be countersunk, cannot be locked into that position. The screw moves freely and is secured in its hexagonal sleeve by a spring. The fastener has a threaded section that screws into the tube and can accordingly be replaced. Once the structure has been erected, this known fastener can definitely be distinguished from the tube. There is only one format that is employed with every diameter of tube.

A third fastener consists of two jaws or flaps that are secured together by a cylindrical countersinking-head screw. The two flaps connect the tube to the node, specifically by way of locking screws that screw onto the tube and node separately. The two flaps have the same outer cross-section as their associated tubes and look like extensions of the tube. Still they are obviously due to their two-part structure, fasteners.

The known fasteners have many drawbacks.

The construction of exhibition booths presupposes a flexible approach to ensure effective results. It must be possible to assemble and disassemble the booth rapidly and easily and to replace defective components, separate the fasteners from the tubes, and interchange the tubes without any problems. The appearance of the booth must also not suffer from unattractive fasteners. Constantly erecting and dismantling the booths is hard on the system's components, and they are often exposed to awkward handling. The threaded components that secure the fastener to the nodes are particularly sensitive to damage. It is accordingly desirable to protect the threads, at least until they are used. None of these requisites are satisfactorily fulfilled, if at all, by the fasteners known up to now.

SUMMARY OF THE INVENTION

The object of the invention is to improve a fastener of the aforesaid type to the extent that its threads will be optimally protected and that the finished structure will be attractive while just as rapid and easy to erect.

This object is attained in accordance with the invention in that the head of the tube-attached screw rotates in the sleeve and has a threaded axial bore that the head with a matching outside thread of an opposing node-attached screw screws into, whereby the thread has the same handedness as the threaded section on the node-attached screw and the bore is long enough to allow the head of the node-attached screw to screw all the way into the head of the tube-attached screw.

The node-attached screw can have a polygonal collar between its threaded section and its head that matches an axial depression in the sleeve that accommodates the node-attached screw.

The tube-attached screw can have a section with a polygonal outer contour between the threaded section and the head.

As will be described hereinafter with reference to one embodiment, the node-attached screw can be retracted into the sleeve while the components are being delivered until the sensitive threads are completely inside it and accordingly protected. To erect the booth it is very simple to position the node-attached screw for assembly by just twisting the sleeve or to screw it directly into the node. The sleeve can have the same outer cross-section as the tube that it is attached to and will accordingly look like an extension of the tube and not be perceived as a fastener.

The result is simple and rapid manipulation of the fastener just by holding and rotating the sleeve. The node-attached screw is countersunk while the components are being delivered and will accordingly be protected from mishandling on site and from damage during shipment. Any damaged fastener or tube can accordingly be replaced with no problem. The countersinking capability of the node-attached screw makes it possible to replace individual supporting struts in the erect structure. The booth will have a integrated appearance due to the one-piece sleeve.

One embodiment of the invention will now be describe with reference to the drawing, wherein

Figures 1, 2:
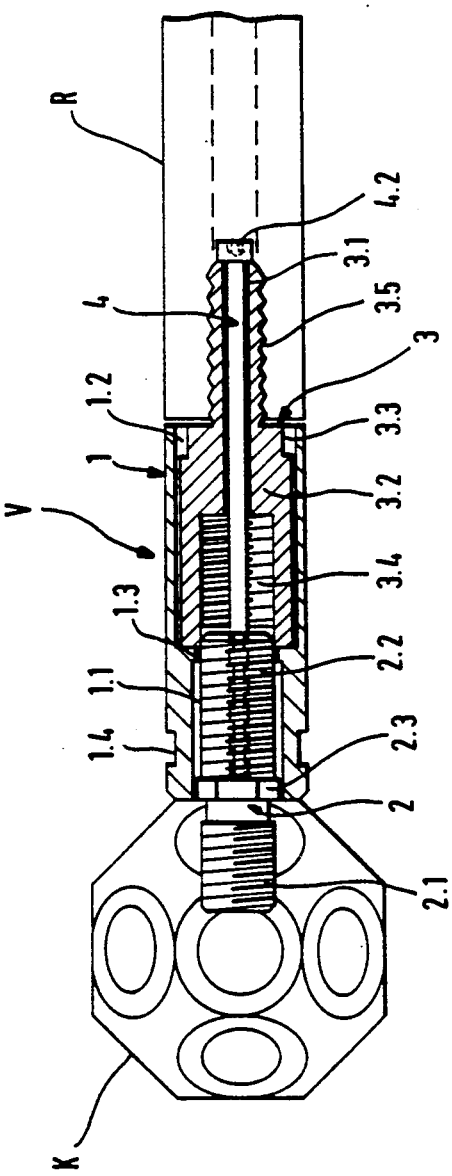
FIG. 1 is a longitudinal section through a fastener as employed with the tube and node assembled.
FIG. 2 is an illustration similar to that in FIG. 1 of the fastener released from the node and ready for shipment.
Figure 3B:
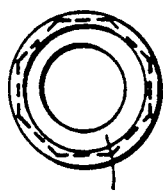
FIGS. 3A through 3C are a section and two head-on views of a sleeve for the fastener illustrated in FIG. 1, FIGS. 4A through 4C are a side view and two head-on views of a node-attached screw for the fastener illustrated in FIG. 1, FIGS. 5A through 5C are a section and two head-on views of a tube-attached screw from the fastener illustrated in FIG. 1, and FIGS. 6A and 6B are a side view and a head-on view of an adjusting screw for the fastener illustrated in FIG. 1.
Figure 3A:
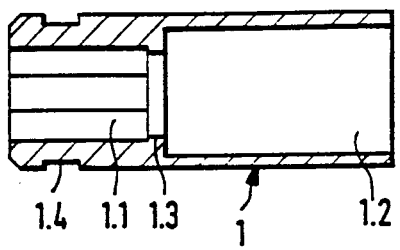
Figure 3C:
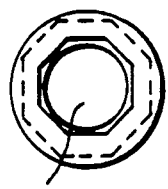
Figure 4B:
Figure 4A:
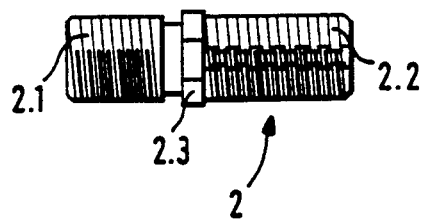
Figure 4C:
Figure 5B:
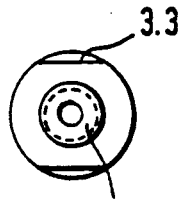
Figure 5A:
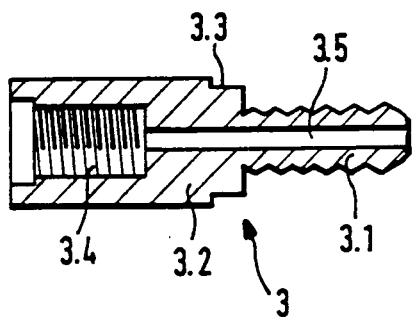
Figure 5C:
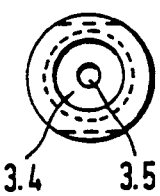
Figure 6A:
Figure 6B:
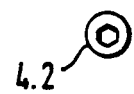

The fastener illustrated assembled in FIGS. 1 and 2 and disassembled in FIGS. 3A through 6B consists of a sleeve 1, a node-attached screw 2, a tube-attached screw 3, and an adjusting screw 4 in the form of a threaded bolt.

DETAILED DESCRIPTION OF THE INVENTION

FIG. 1 illustrates fastener V secured to both a node K and a tube R, both represented schematically.

Referring now to FIG. 1 and FIGS. 3–6, the end of sleeve 1 that faces node K has a hexagonal depression 1.1 that accommodates the head 2.2 of a node-attached screw with its threaded section 2.1 extending outward and screwing into a matching threaded bore in the node. Node-attached screw 2 is positioned in depression 1.1 by a matching hexagonal collar 2.3 between the threaded section and the head such that it can slide in and out but not rotate. Head 2.2 has an outside thread. The opposite end of sleeve 1 has a round opening 1.2 that the head 3.2 of a tube-attached screw 3 screws into. Head 3.2 has no thread and can accordingly rotate inside sleeve 1. The end of the head 3.2 of tube-attached screw 3 opposite the head 2.2 of node-attached screw 2 has a threaded bore 3.4 that the head 2.2 of node-attached screw 2 screws into. Head 3.2 also rests against a stop 1.3 in the form of a collar inside the sleeve. Bore 3.4 is long enough to allow, when it is in the state illustrated FIG. 2 with the head 2.2 of node-attached screw 2 screwed all the way into bore 3.4, the threaded section 2.1 o node-attached screw 2 to retract all the way into sleeve 1, so that screw 2 will be entirely inside the sleeve. In other words, the sum of the length of bore 3.4 and of the remaining length of sleeve 1 in front of bore 3.4 must geometrically at least equal the total length of node-attached screw 2. The threads in bore 3.4 or on head 2.2 have the same handedness as the threaded section 2.1 on node-attached screw 2. Adjusting screw 4 extends from the side of tube R through an axial bore 3.5 in tube-attached screw 3, with its threaded section 4.1 screwed into a threaded axial bore in the head 2.2 of node-attached screw 2, whereby the head 4.2 of adjusting screw 4 rests, once the components have been assembled, against the threaded section 3.1 of tube-attached screw 3. Between its head 3.2 and its threaded section 3.1, tube-attached screw 3 has a section 3.3 with two parallel surfaces for a wrench to be positioned against. The round opening 1.2 in sleeve 1 is long enough to allow, once the components have been assembled with head 3.2 resting against stop 1.3, section 3.3 to fit inside sleeve 1, where it will be invisible. Sleeve is round along most of its length and has a polygonal contour for accommodating a wrench only along a section 1.4 that is short in relation to the sleeve as a whole.

The sequence to be followed when assembling the fastener V and connecting it to tube R and node K will now be described.

Tube-attached screw 3 is screwed into the round opening 1.2 in sleeve 1, with the thread inside bore 3.4 screwing over the outer thread on the head 2.2 of the node-attached screw 2 inserted in the hexagonal depression 1.1 in sleeve 1 until the collar 2.3 on node-attached screw 2 is flush with the sleeve. Adjusting screw 4 is inserted through the bore 3.5 in tube-attached screw 3 and screwed into the threads inside the head 2.2 of node-attached screw 2. Sleeve 1 can, in this position, slide back and forth, and section 3.3 will remain accessible to a wrench against tube-attached screw 3. The threaded section 3.1 of tube-attached screw 3 is screwed into tube R and tightened. Node-attached screw 2 is now rotated into its shipping position, illustrated in FIG. 2, inside sleeve 1. In the shipping position, fastener V is forced against node K and node-attached screw 2 is screwed into and tightened within the node by rotating the sleeve in what is now the opposite direction, resulting in the state represented in FIG. 1. The node-attached screw can be locked axially into any prescribed position b the threaded attachment between node-attached screw 2 and tube-attached screw 3, with the more or less extensive screwing-in of adjusting screw 4 providing a variable terminating stop for the inward rotation of node-attached screw 2. The fastener is removed by repeating the same procedure in the opposite sequence.

The fastener described herein can be made from various materials in accordance with its purpose. It has turned out to be practical for node-attached screw 2, tube-attached screw 3, and adjusting screw 4 to be made of steel and sleeve 1 of an aluminum allow.

What is claimed is:

1. A fastener for construction systems having tubes and nodes, the fastener comprising one screw for attaching to a tube and having a threaded shaft and a head, another screw for attaching to a node and having a threaded screw shaft, an elongated sleeve having an axis, means mounting the tube-attaching screw in the sleeve with the shaft aligned with the axis, the head surrounded by the sleeve and the shaft extending outwardly thereof for sliding movement along the axis and for rotation around the axis, means mounting the node-attaching screw in the sleeve for sliding movement along the axis and without rotation around said axis, means securing the node-attaching screw to the tube-attaching screw comprising a threaded bore in the head of the tube-attaching screw and a threaded bolt extending from the node-attaching screw and with the same thread direction and threadably engageable with the threaded bore, and wherein the bore, the sleeve and the node-attaching screw are configured to permit the bolt to be screwed into the bore to such an extent to dispose the node-attaching screw entirely in the sleeve.

2. The fastener according to claim 1, wherein the node-attaching screw has a polygonal collar between the screw shaft of the node-attaching screw and the threaded bolt and wherein the means mounting the node-attaching screw in the sleeve for sliding movement without rotation comprises an axial depression that has a cross section which matches the cross section of the collar and receives same therein.

3. The fastener according to claim 1, wherein the tube-attaching screw has a section between the head and the threaded screw shaft with a polygonal outer contour.

4. The fastener according to claim 3, further comprising a stop in the sleeve against the head of the tube-attaching screw rests and wherein the sleeve is configured to allow the contoured section of the tube-attaching screw to be completely within the sleeve when the head rests against the stop.

5. The fastener according to claim 1, wherein the sleeve has a round outer contour and a section with a polygonal contour which is short in length as compared to the length of the sleeve.

6. The fastener according to claim 1, wherein the shaft of the tube-attaching screw has an axial throughbore and the node-attaching screw has a threaded bore therein aligned with the axial throughbore and further comprising a threaded screw having an elongated threaded shaft configured to be received in the axial throughbore and threadably engageable with the threaded bore in the node-attaching screw and a round head abutting an end of the tube-attaching screw and having a diameter greater than that of the axial throughbore and less than that of the threaded screw shaft of the tube-attaching screw.

* * * * *